(12) United States Patent
Chisnall et al.

(10) Patent No.: US 11,526,613 B2
(45) Date of Patent: Dec. 13, 2022

(54) EXECUTION ENVIRONMENT AND GATEKEEPER ARRANGEMENT

(71) Applicant: Microsoft Technology Licensing, LLC, Redmond, WA (US)

(72) Inventors: David Thomas Chisnall, Cambridge (GB); Cédric Alain Marie Fournet, Cambridge (GB); Manuel Costa, Cambridge (GB); Samuel Alexander Webster, Cambridge (GB); Sylvan Clebsch, Cambridge (GB); Kapil Vaswani, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 598 days.

(21) Appl. No.: 16/503,455

(22) Filed: Jul. 3, 2019

(65) Prior Publication Data
US 2021/0004469 A1 Jan. 7, 2021

(51) Int. Cl.
*G06F 21/00* (2013.01)
*G06F 21/57* (2013.01)
(Continued)

(52) U.S. Cl.
CPC ........ *G06F 21/577* (2013.01); *G06F 9/45558* (2013.01); *H04L 63/105* (2013.01);
(Continued)

(58) Field of Classification Search
None
See application file for complete search history.

(56) References Cited

U.S. PATENT DOCUMENTS 9,027,078 B1  5/2015  Manmohan
9,300,693 B1 * 3/2016  Manmohan ......... G06F 9/45558
(Continued)

FOREIGN PATENT DOCUMENTS

WO  2017020716 A1  2/2017
WO  2017058842 A1  4/2017
WO     3217310 A1  9/2017

OTHER PUBLICATIONS

Martin, et al. "A Framework for Application Partitioning Using Trusted Execution Environments." Concurrency and Computation: Practice and Experience, vol. 29, No. 23, Wiley, 2017, p. e4130. (Year: 2017).*

(Continued)

*Primary Examiner* — Jeffery L Williams (57) ABSTRACT

A computer system has a separation mechanism which enforces separation between at least two execution environments such that one execution environment is a gatekeeper which interposes on all communications of the other execution environment. The computer system has an attestation mechanism which enables the gatekeeper to attest to properties of the at least two execution environments. A first one of the execution environments runs application specific code which may contain security vulnerabilities. The gatekeeper is configured to enforce an input output policy on the first execution environment by interposing on all communication to and from the first execution environment by forwarding, modifying or dropping individual ones of the communications according to the policy. The gatekeeper provides evidence of attestation both for the application specific code and the policy.

20 Claims, 7 Drawing Sheets

(51) Int. Cl.
  *G06F 9/455* (2018.01)
  *H04L 9/40* (2022.01)
(52) U.S. Cl.
  CPC .............. *G06F 2009/45595* (2013.01); *G06F 2221/033* (2013.01)

(56) References Cited

U.S. PATENT DOCUMENTS

| | | | | |
|---|---|---|---|---|
| 2013/0061313 | A1* | 3/2013 | Cullimore | H04L 63/0227 726/13 |
| 2016/0014078 | A1* | 1/2016 | Schrecker | H04L 63/105 726/12 |
| 2016/0014159 | A1* | 1/2016 | Schrecker | H04L 63/20 726/1 |
| 2016/0034702 | A1* | 2/2016 | Sikka | G06F 21/602 726/27 |
| 2018/0232517 | A1* | 8/2018 | Roth | G06F 21/50 |
| 2018/0373881 | A1* | 12/2018 | Thom | H04L 9/30 |
| 2019/0042671 | A1* | 2/2019 | Caspi | G06F 30/3323 |
| 2019/0173861 | A1* | 6/2019 | Smith | H04L 63/061 |
| 2019/0253398 | A1* | 8/2019 | Sun | G06F 21/6263 |
| 2019/0266330 | A1* | 8/2019 | Thaler, III | G06F 21/554 |
| 2020/0028868 | A1* | 1/2020 | Sood | H04L 67/34 |
| 2020/0314123 | A1* | 10/2020 | Staab | H04L 63/1416 |
| 2020/0322382 | A1* | 10/2020 | Wang | H04L 63/0281 |
| 2020/0372166 | A1* | 11/2020 | Porter | H04L 67/10 |
| 2021/0004469 | A1* | 1/2021 | Chisnall | G06F 21/577 |
| 2022/0052919 | A1* | 2/2022 | Xia | H04L 67/025 |
| 2022/0103593 | A1* | 3/2022 | Singh | H04L 63/0245 |

OTHER PUBLICATIONS

Atamli-Reineh, A., & Martin, A.P. (2015). Securing Application with Software Partitioning: A Case Study Using SGX. SecureComm. (Year: 2015).*

Frank McKeen, et al, 2013. Innovative instructions and software model for isolated execution. In Proceedings of the 2nd International Workshop on Hardware and Architectural Support for Security and Privacy (HASP '13). Association for Computing Machinery, New York, NY, USA, Article 10, 1. (Year: 2013).*

Lind, J., Priebe, C., Muthukumaran, D., O'Keeffe, D., Aublin, P., Kelbert, F., Reiher, T., Goltzsche, D., Eyers, D., Kapitza, R., Fetzer, C., & Pietzuch, P.R. (2017). Glamdring: Automatic Application Partitioning for Intel Sgx. Usenix Annual Technical Conference. (Year: 2017).*

Noubir, Guevara and Amirali Sanatinia. "Trusted Code Execution on Untrusted Platforms Using Intel SGX." (2016). (Year: 2016).*

"International Search Report and Written Opinion Issued in PCT Application No. PCT/US20/033007", dated Jul. 7, 2020, 15 Pages.

* cited by examiner

FIG. 7

EXECUTION ENVIRONMENT AND GATEKEEPER ARRANGEMENT

BACKGROUND

Compute nodes in data centers typically have one or more execution environments used by tenants of the data center. An execution environment in a compute node is a physical or virtual machine, where a virtual machine is either a virtualized or paravirtualized abstraction of real hardware or a higher-level abstraction. A non-exhaustive list of examples of execution environment is a privilege level, a virtual machine, a processor.

A remote tenant who uses the data center resources is able to upload code to one or more execution environments in the data center so that the code executes in the data center. An execution environment is typically able to communicate with other entities in the data center and with other entities outside the data center, such as to obtain data to be processed or to send computation results.

In many cases the remote tenant uploads code which is complex and potentially contains security vulnerabilities. As a result running software applications in the cloud is often no more secure than running the software application locally.

The embodiments described below are not limited to implementations which solve any or all of the disadvantages of known execution environments.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a computer system comprising at least two execution environments. The computer system has a separation mechanism which enforces separation between the at least two execution environments such that one execution environment is a gatekeeper which interposes on all communications of the other execution environment. The computer system has an attestation mechanism which enables the gatekeeper to attest to properties of the at least two execution environments. A first execution environment runs application specific code which may contain security vulnerabilities or may be actively malicious, in the case of trojaned third-party code. The gatekeeper is configured to enforce an input output policy on the first execution environment by interposing on all communication to and from the first execution environment by forwarding, modifying or dropping individual ones of the communications according to the policy. Thus outgoing communications from the first execution environment are sent out of the computer system according to the policy and incoming communications to the first execution environment are admitted according to the policy. The gatekeeper provides evidence of attestation both for the application specific code and the policy.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Figure 1:
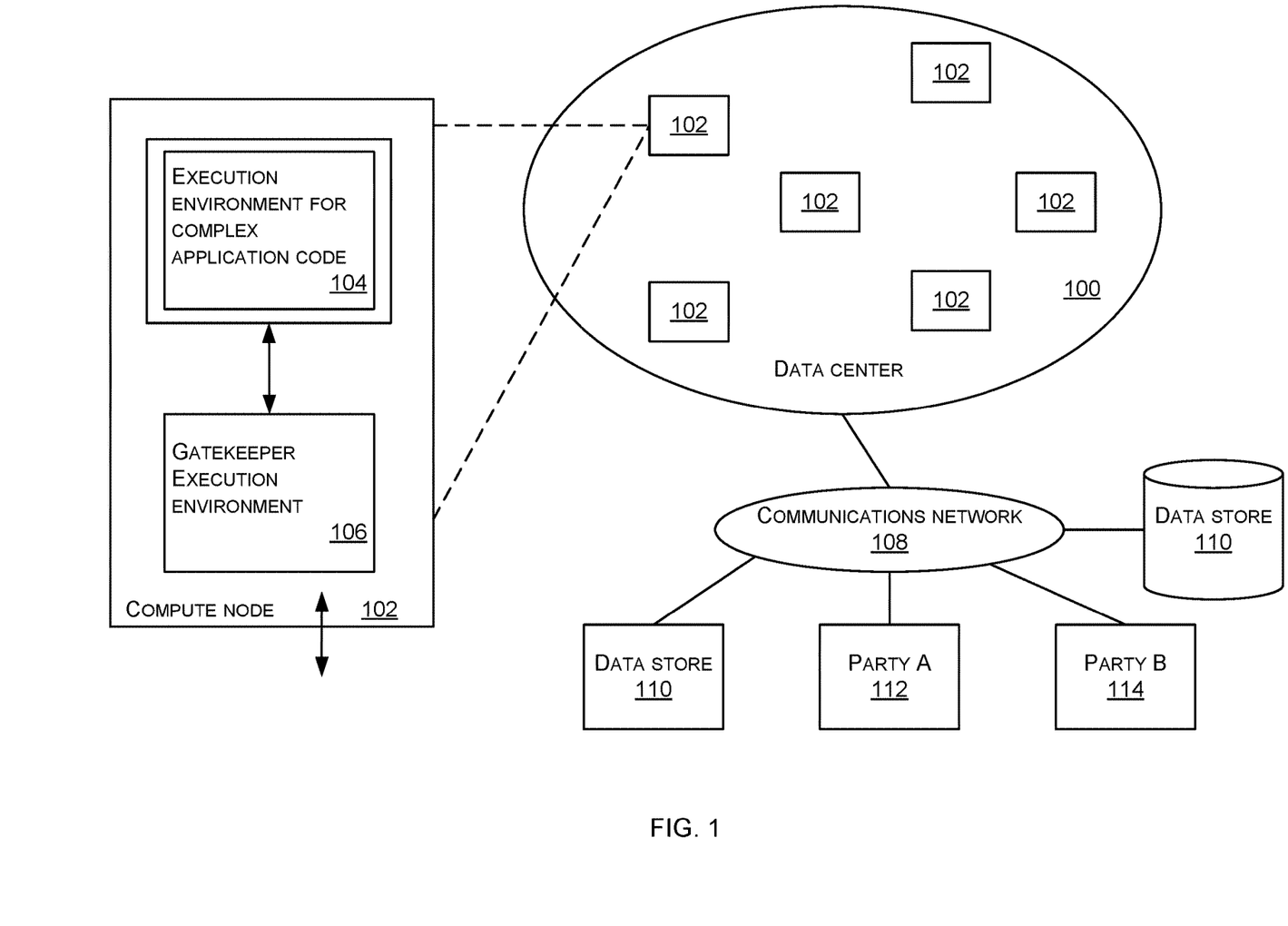
FIG. 1 is a schematic diagram of a data center with a plurality of compute nodes, where an individual compute node has a separation mechanism enforcing separation between at least two execution environments, one of which is a gatekeeper.

FIG. 1 shows a data center 100 with a plurality of compute nodes 102 interconnected by a communications network within the data center (not shown). The data center is connected to a communications network 108 such as the internet, an intranet or another communications network. The data center 100 has access to one or more data stores 110. Remote parties, such as party A 112 and party B 114, are able to use the resources of the data center. Remote parties A and B are computer-implemented.

Suppose a remote tenant such as party A uploads code to an execution environment in the data center at one of the compute nodes 102. The code is application code that party A wants to execute in order to provide a service or carry out processing tasks such as processing party B's encrypted data from secure data store 110. However, party A is aware that the code potentially contains security vulnerabilities. Party A is unable to carry out a full security audit because of lack of resources. The code may have flaws that are too difficult or too expensive to fix so that isolating the code without modifying it is preferable. Typically the code is too large for party A to formally verify the code. Thus when the code executes it could result in security breaches and/or harm. It is also possible that party A is a malicious actor who embeds code in party A's service that intentionally leaks or damages party B's data and sells a service to party B. Damage is potentially caused to one or more of: the data center 100, the secure data store 110, party A 112, party B 114.

In the case that a trusted execution environment is used in the data center compute node 102 problems still arise. Even though a trusted execution environment provides protection against external tampering there is still a possibility of security problems arising. This is because the application code that party A wants to execute at one of the compute nodes 102 potentially comprises security vulnerabilities. Even where a trusted execution environment is used, such as an enclave or other trusted execution environment, there is an assumption that the application code uploaded to the trusted execution environment is trusted, that is, does not contain security vulnerabilities. In this context, "does not contain security vulnerabilities" means that the application code does precisely what the user of the application code expects and nothing more or less. Typical simple trusted execution environments contain small amounts of code that is assumed to be correct. This code is typically small enough that it can be audited or even formally verified. As hardware functionality increases and data center tenants begin to run entire commodity operating systems and middleware stacks inside a trusted execution environment, it is increasingly difficult to justify the assumption that the code is free from security vulnerabilities. The protection from external tampering afforded by the trusted execution environment is still valuable but may not be adequate for higher-level security guarantees.

Consider an example where compute nodes in the data center 100 comprise application code that party A has uploaded in order to provide a service which indexes party A's encrypted data. The service indexing party A's encrypted data is given access to one or more of the data stores 110 reads data from the accessed data store(s) and writes an encrypted index to a specific storage blob. In a conventional trusted execution environment design, if party A's encrypted file store contains a malformed file (perhaps a malicious image in a web browser cache directory inside a backup) that triggers an arbitrary code execution vulnerability, then an attacker is able to send all of party A's files (or simply an encryption key of the files) across the network, or at least able to write the index unencrypted, bypassing some of the confidential computing guarantees.

The technology of the present disclosure provides a gatekeeper execution environment 106 for use with another execution environment 104. The other execution environment 104 is referred to herein as an "isolated" execution environment 104 for ease of understanding even though it is not completely isolated. The isolated execution environment 104 holds application code which potentially contains security vulnerabilities and, for example, has been uploaded by party A. Since the application code potentially contains security vulnerabilities, it is recognized herein that one way to cope with the potential security vulnerabilities, is to limit which entities the application code is able to communicate with. Another option is to enforce particular encryption that must be used for communication between the application code and other entities. The gatekeeper execution environment 106 (referred to herein as gatekeeper 106 for brevity) has access to a policy which specifies details about which entities the application code is able to communicate with and/or details about encryption of communications with the application code. The gatekeeper 106 interposes on all communications with the isolated execution environment 104 and is able to apply the policy to those communications. In this way it is possible to execute complex application code that potentially contains security vulnerabilities in a manner which gives security guarantees. When party A's application has finished and the compute node(s) are to be used by another party with different application code, then the policy is easily replaced by a different policy. The gatekeeper 106 is able to attest to properties of the isolated execution environment as well as to its own properties. Thus party A is able to receive an attestation from the gatekeeper in order that party A is confident that the correct application code and/or correct policy are being executed. The attestation arrives before a tenant provisions either execution environment 104 or gatekeeper 106 with decryption keys to access the data. Note that in some cases (such as using a key service or an attestation service in the cloud) the attestation is presented to a trusted intermediary instead of Party A to obtain the keys.

FIG. 1 shows an exploded view of one of the compute nodes 102 of the data center. In the exploded view there is a gatekeeper 106 and an isolated execution environment 104. The compute node comprises other components described later with reference to FIG. 8 and which are not given in FIG. 1 for clarity. One or more others of the compute nodes 102 of the data center have a gatekeeper 106 and an isolated execution environment 106.

A separation mechanism is used which enforces separation between the gatekeeper and the other execution environment, and which enables the gatekeeper to interpose on all communications with the other execution environment. The separation mechanism is implemented using any one or more of: hardware, software, firmware. Examples of the separation mechanism are described with reference to FIGS. 2 to 5. The gatekeeper has an attestation mechanism which enables the gatekeeper to attest to properties of the at least two execution environments (itself and the other execution environment). The attestation mechanism is implemented using any one or more of: hardware, software, firmware.

The gatekeeper execution environment of the disclosure operates in an unconventional manner to achieve secure execution of application code in another execution environment.

The gatekeeper execution environment improves the functioning of the underlying computing device by interposing on communications with another execution environment in which application code containing potential security vulnerabilities is executing.

Figure 2:
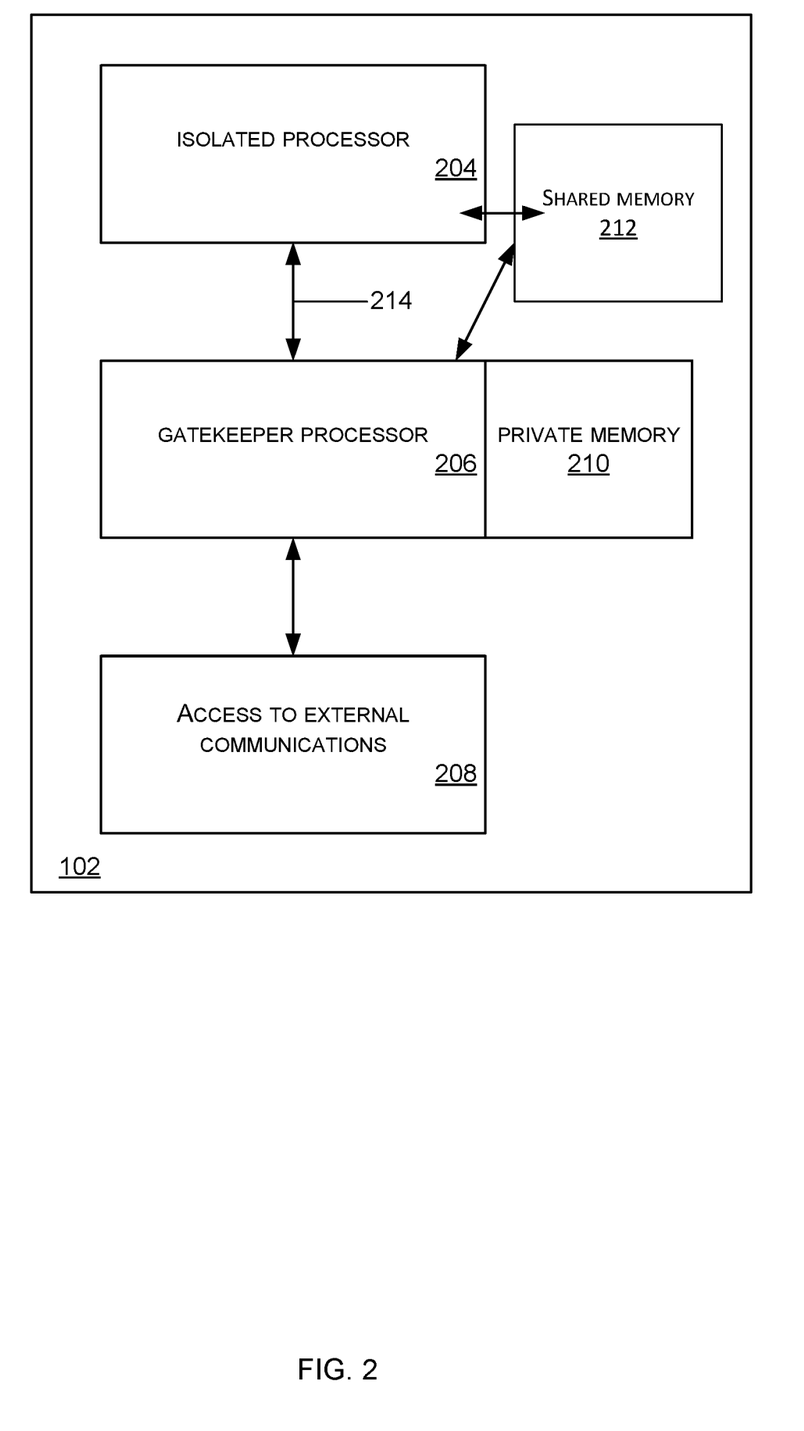
FIG. 2 is a schematic diagram of a separation mechanism comprising an isolated processor connected to a gatekeeper processor.

FIG. 2 shows an example where the separation mechanism is implemented using hardware. An isolated processor 204 has private memory 210 and, aside from this, access only to a region of shared memory 212 (for example, a bank of on-die static random access memory (SRAM)) and an interrupt line 214 connecting it to a gatekeeper processor 206. The gatekeeper processor has access 208 to external communications, for example via a peripheral component interconnect (PCIe) bus or a network interface. This gateway processor 206 is used to provide a gatekeeper service and, in some examples, to load code onto the main core (that is, the isolated processor 204). The isolated processor 204 is physically isolated except for the interrupt line connecting it to the gatekeeper processor. In this way the physical arrangement of the isolated processor 204, interrupt line and the gatekeeper processor 206 enables separation of the gatekeeper and the other execution environment (which is on the isolated processor 204).

Complex application code executes on the isolated processor 204 and the gatekeeper processor 206 interposes on all communications to and from the isolated processor 204. The gatekeeper processor 206 modifies, drops or forwards individual communications to and from the isolated processor 204 according to a policy as described above with reference to FIG. 1. The policy is stored in the private memory 210 and the complex application code, which potentially comprises security vulnerabilities) is unable to tamper with the policy because the memory is private to gatekeeper processor 206 and not accessible by isolated processor 204.

In the example of FIG. 2 the gatekeeper processor 206 has an attestation mechanism which enables the gatekeeper to attest to properties of itself and the isolated processor 204. The gatekeeper processor 206 is able to attest to the policy that it applies to the communications to and from the isolated processor 204. The gatekeeper processor 206 is able to attest to the complex application code executing on the isolated processor 204. Any suitable attestation mechanism is used. For example, the processor provides hardware or firmware support to securely measure the code and the configuration of the gatekeeper, and it uses a hardware or firmware secret to sign the resulting measurements. In some examples, the processor additionally signs credentials provided to the code of the gatekeeper. For example, the processor additionally signs the gatekeeper policy loaded into the private memory, and the configuration and the code used to create the isolated execution environment. As another example, the code of the gatekeeper obtains a measurement of the configuration and the code of the isolated execution environment from the isolated processor, and then signs them together with the gatekeeper policy using the credentials provided by the gatekeeper processor. In some cases the processor also provides additional supporting evidence, such as for example cryptographic certificates from the hardware provider and the cloud provider that endorse the signing key used for attestation by the processor. Thus, the evidence produced by the attestation mechanism consists of a collection of cryptographic signatures or certificates that, in combination, attests to the properties of the two execution environments.

Figure 3:
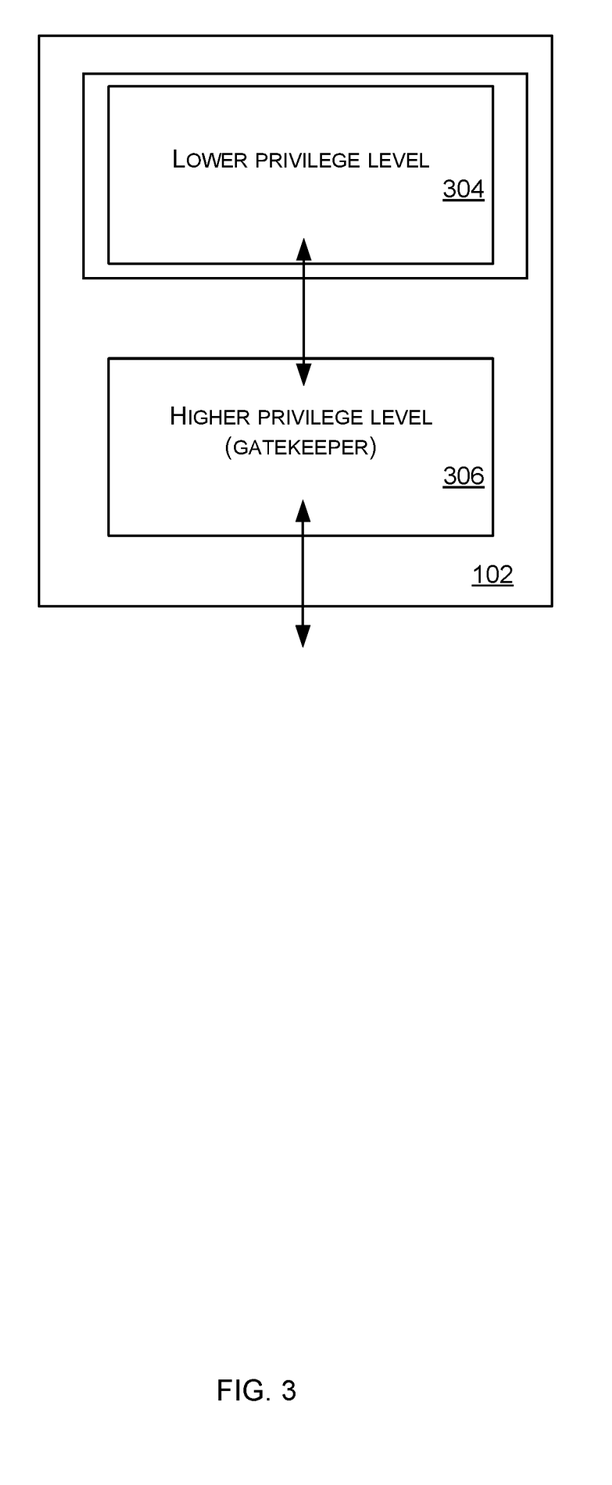
FIG. 3 is a schematic diagram of a separation mechanism comprising two privilege levels.

FIG. 3 shows an example where the separation mechanism is formed using software. The isolated execution environment is a lower privilege level 304 and the gatekeeper execution environment is a higher privilege level 306 of the compute node 102. In an example the lower privilege level 304 is a user mode and the higher privilege level 306 is a supervisor mode of an enclave or an encrypted virtual machine. The privilege levels are implemented such that the lower privilege level 304 is only able to communicate with the higher privilege level 306 using the same separation mechanisms used in conventional operating systems.

In an example the privilege levels 304, 306 of FIG. 3 are part of an encrypted virtual machine comprising a hypervisor (not shown in FIG. 3). In this case the higher privilege level (gatekeeper) 306 computes an attestation comprising an attestation quote which guarantees that memory assigned by the lower privilege level 304 is not accessible by the hypervisor and that neither the hypervisor nor the application code executing in the lower privilege level 304 can modify this. The higher privilege level 306 is also able to compute an attestation to attest to the policy used by the gatekeeper. The hypervisor cannot alter control or data flow in the lower privilege level 304 without going via the higher privilege level 306. The lower privilege level 304 cannot directly issue hypercalls.

Shared ring buffers or other communication channels are implemented between the two privilege levels and constructed to ensure that all data entering or leaving the lower privilege level 304 is subject to a policy enforced by the gatekeeper in the higher privilege level 306. In this example, typically all memory owned by the lower privilege level is visible to the higher privilege level and so the gatekeeper is able to read and write memory owned by the higher privilege level, rather than needing it to be marshalled into a ring buffer.

Figure 4:
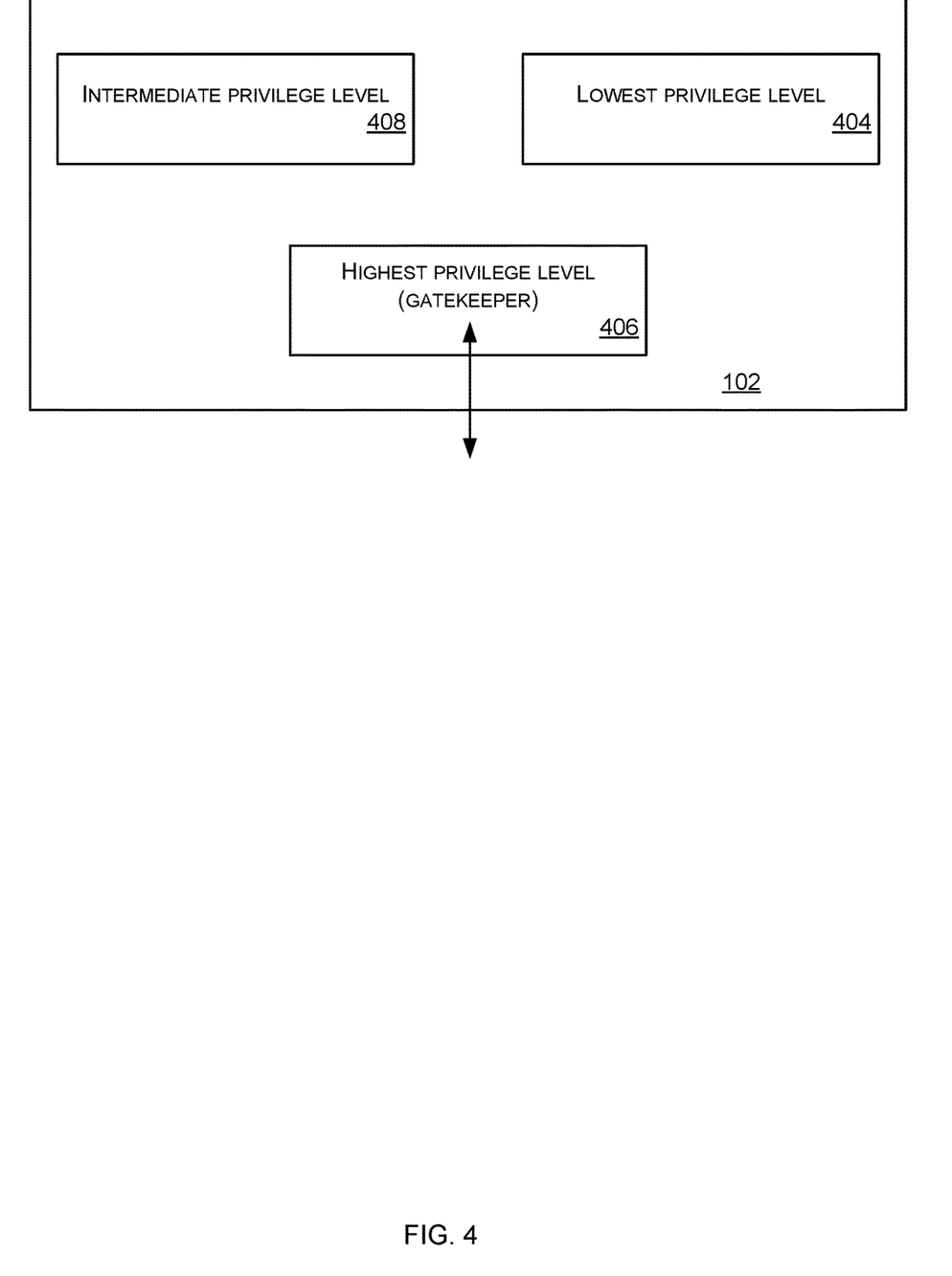
FIG. 4 is a schematic diagram of a separation mechanism comprising three privilege levels.

FIG. 4 is an example, similar to FIG. 3, but where there are more than two privilege levels. In this example the highest privilege level is a gatekeeper 406 and there are two other privilege levels (an intermediate privilege level 408 and a lower privilege level 404). Both the intermediate privilege level 408 and the lower privilege level 404 are isolated except that the lower privilege level is able to communicate with the intermediate privilege level and the intermediate privilege level is able to communicate with the highest privilege level. The highest privilege level 406 is able to communicate directly with the lowest privilege level 404, though whether it does so depends on the specific implementation (such as where device pass-through is done in the kernel). The lowest privilege level 404 is unable to initiate communication with the highest privilege level 406.

Application code, which potentially comprises security vulnerabilities, executes at the lower privilege level 404 and the intermediate privilege level 408. In an example the application code comprises a full operating system and userspace.

The highest privilege level 406 acts as a gatekeeper as described earlier. It applies a policy in order to drop, modify or forward communications with the intermediate privilege level 408.

The highest privilege level 406 is configured to compute an attestation to attest to the policy and to the application code on the intermediate and lowest privilege levels 404, 408.

Figure 5:
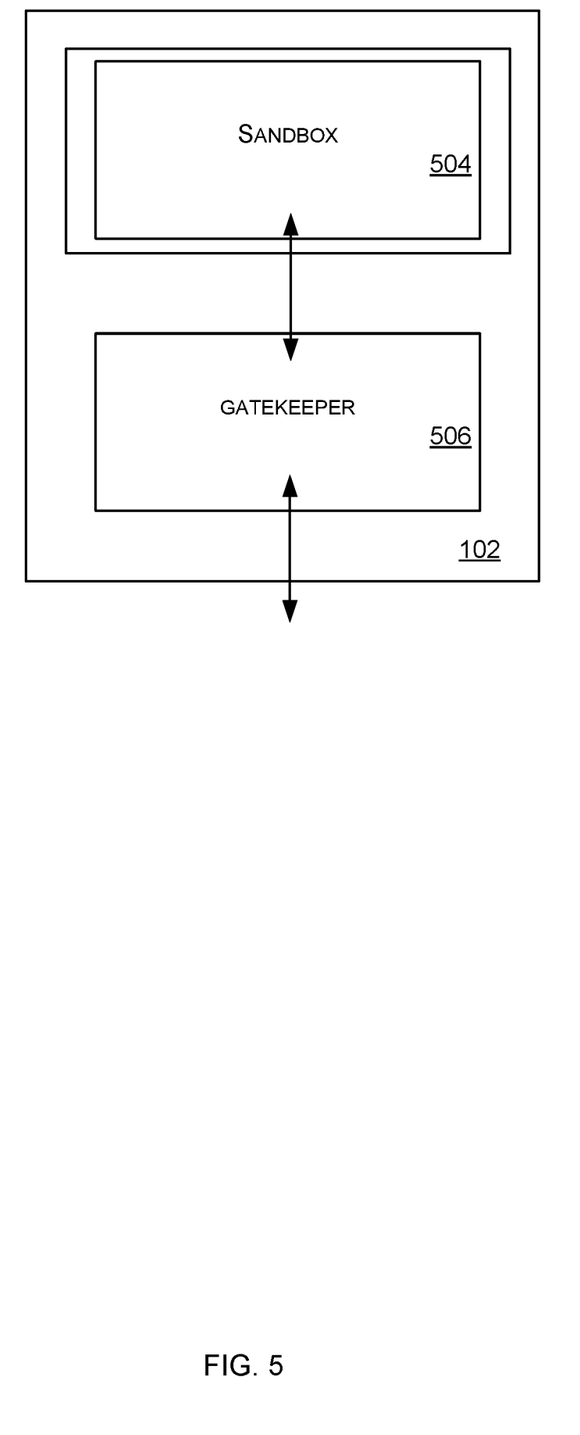
FIG. 5 is a schematic diagram of a separation mechanism comprising a sandbox.

FIG. 5 is an example where a software-enforced sandbox 504 is used as the isolated execution environment. Conventional software fault isolation techniques and/or language-based virtual machines are used to create the software-enforced sandbox 504. The application code is able to run in the software-enforced sandbox 504, with a combination of static and dynamic checks to ensure that the application code in the sandbox cannot access any memory outside of the software-enforced sandbox 504. A gatekeeper 506 is implemented using a single hardware-provided privilege level inside a trusted execution environment. The gatekeeper interposes on all communication with the sandbox 504 and drops, modifies or forwards individual communications according to a policy as described above.

In some examples, the gatekeeper 506 is responsible for setting up the software-enforced sandbox 504 and starting the application code such as an operating system.

The gatekeeper 506 provides an attestation mechanism to attest to the policy and the application code in the software-enforced sandbox 504.

Figure 6:
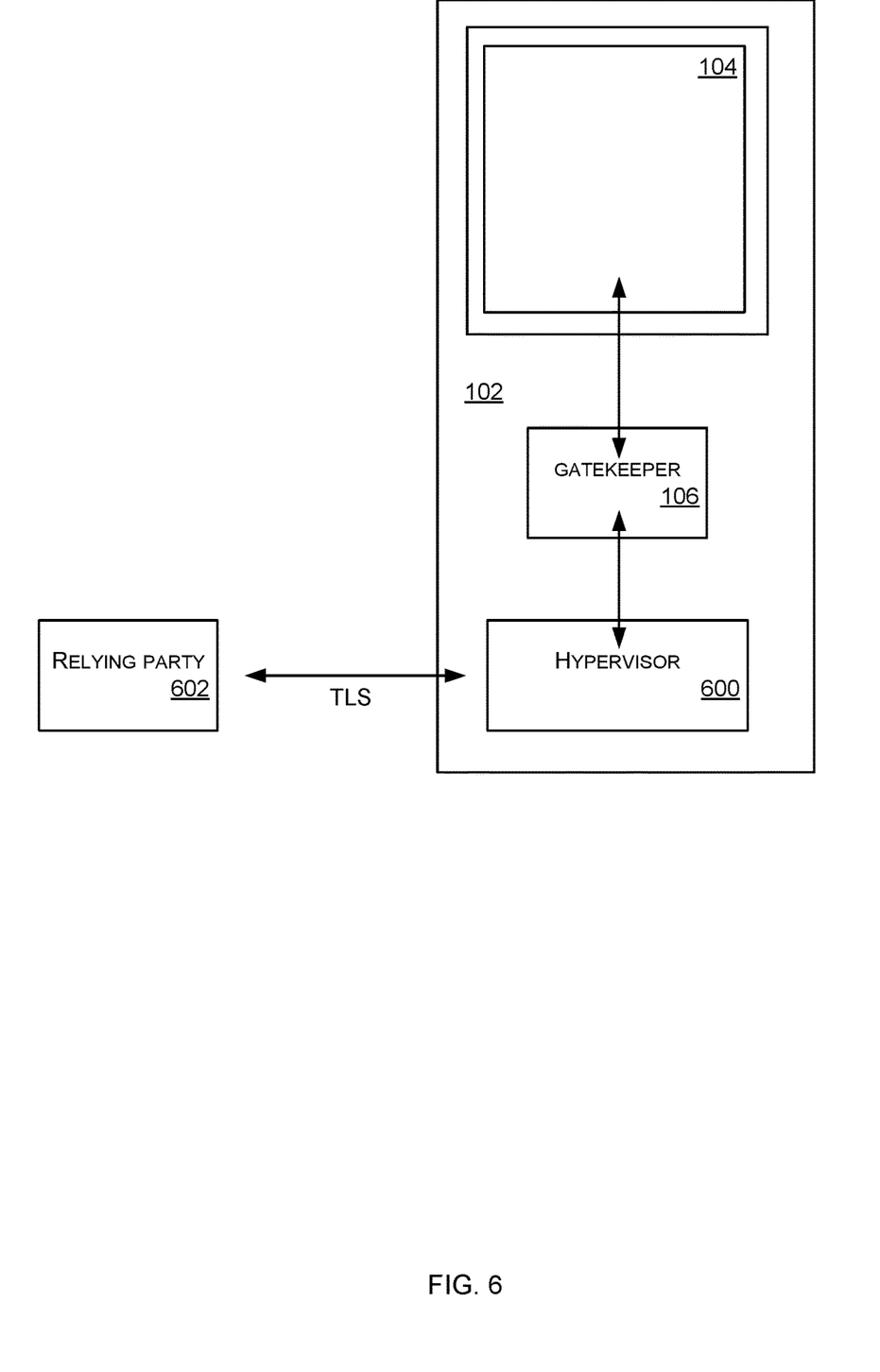
FIG. 6 is a schematic diagram of a separation mechanism used with a hypervisor.

FIG. 6 is a schematic diagram of a separation mechanism used with a hypervisor 600. The isolated execution environment 104 is isolated using physical isolation and/or software isolation and is able to communicate with only a gatekeeper 106 execution environment. The gatekeeper execution environment interposes on all communication with the isolated execution environment 104 according to a policy as described above.

The gatekeeper 106 exposes paravirtualised (or emulated) devices that appear (from the point of view of the application code in the isolated execution environment 104) to be storage devices with built-in encryption support and network interfaces with full transport layer security (TLS) offload. From the perspective of the application code running on the inner execution environment 104, the application code reads from and writes to one or more disks and accepts and initiates encrypted network connections. The gatekeeper 106 enforces both encryption and access-control policies. In an example, it rejects all inbound network connections that do not establish a transport security layer (TLS) connection and presents a client certificate signed by the authorized party. A relying party 602 is in communication with the hypervisor 600 using a transport security layer. The gatekeeper 106 computes an attestation quote which attests to the policy and the application code on the isolated execution environment 104.

In an example, the arrangement of FIG. 6 is used in a plurality of compute nodes of the data center of FIG. 1 in order to allow an enterprise to deploy a service in the cloud that is usable only by employees of the enterprise and is protected from attacks by anyone else. In this example, the compute nodes 102 store code of the service at the isolated execution environments of the compute nodes. The gatekeepers only allow communication with the isolated execution environments if the communication is associated with an employee of the enterprise. If a third party (who is not an employee) tries to exploit a vulnerability in the code of the service, then the attack is prevented because the gatekeeper only allows communications from employees.

Similarly, enforced encryption, with the policies and encryption keys being guaranteed by the attestation quote, allows access to storage services while making it impossible for the application code in the inner execution environment 104 to violate encryption requirements.

The example of FIG. 6 also provides some resistance to covert channels. For example, it is not possible to create a covert channel using the padding in transport security layer blocks when the gatekeeper 106 is responsible for constructing the transport security layer packets.

Figure 7:
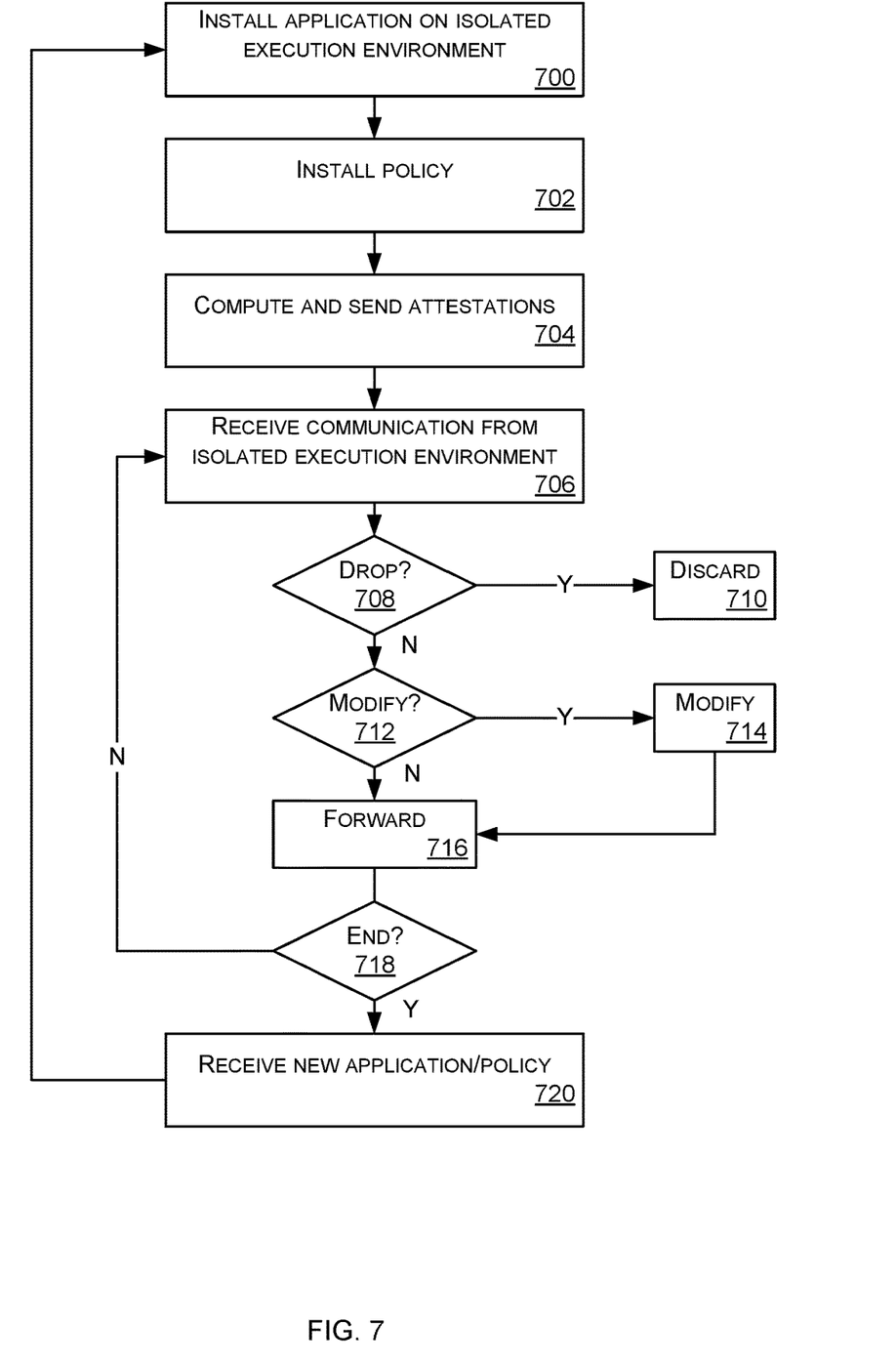
FIG. 7 is a flow diagram of a method of operation at a gatekeeper; Like reference numerals are used to designate like parts in the accompanying drawings.

FIG. 7 is a flow diagram of a method performed by a gatekeeper execution environment 106 such as any of the gatekeeper execution environments of FIGS. 2 to 6 (referred to as a gatekeeper for brevity). When a data center tenant wants to use the data center resources to execute application code, a request is sent to the gatekeeper to install the application code on the isolated execution environment 104. The gatekeeper carries out the installation by loading the code in the same way that it would run without the gatekeeper. For example, by creating a virtual machine and loading the kernel, or loading a WebAssembly (trade mark) program into a WebAssembly software fault isolation container. The request includes information about a policy to be installed at the gatekeeper and the policy is installed 702 according to the data center tenant requirements.

The gatekeeper computes one or more quotes to attest to the policy and to the application code on the isolated execution environment 104. The gatekeeper computes the quotes using conventional methods such as cryptographic hashes, signatures, and certificates. The gatekeeper may also include additional supporting signatures and certificates provided by the hardware provider and by the cloud provider. The quotes are sent to the data center tenant such as relying party 602 of FIG. 6 or party A 112 or Party B 114 of FIG. 1 and the data center tenant is able to check the quotes to make sure that the expected policy and application code are being used in the data center.

The isolated execution environment executes the application code and reaches a point in the execution where it has to send a communication to another entity in order to read data, write data, send a request or for other reasons. The isolated execution environment sends the communication and the gatekeeper receives 706 the communication since all communication with the isolated execution environment is via the gatekeeper. The gatekeeper inspects the communication such as by inspecting a header of a packet where the communication is a packet.

The gatekeeper checks 708 whether to drop the communication. The gatekeeper applies the policy such as by checking if a destination specified in the header of the packet is on a white list of destinations listed in the policy. If the destination is not on a white list of destinations listed in the policy then the gatekeeper drops the packet and the packet is discarded 710.

If the communication is not dropped then the gatekeeper proceeds to check 712 whether the communication is to be modified or not. In an example the gatekeeper checks if the communication is already encrypted using an encryption scheme specified in the policy. If not the gatekeeper modifies 714 the communication by encrypting it appropriately and then forwarding 716 the communication towards the destination specified in the header. If the check 712 finds that the communication does not need to be modified then the communication is forwarded 716 towards the destination specified in the header.

A check 718 is made to see whether to end the execution of the application such as by checking whether a time interval has expired or whether a specified number of iterations of the method of FIG. 7 has occurred. If the execution is to continue then operation of the method of FIG. 7 repeats from operation 706. If the execution of the application is ended then the gatekeeper waits and eventually receives 720 a new application and/or new policy. The gatekeeper proceeds to install the new application at operation 700 and the method of FIG. 7 repeats.

In this way the method of FIG. 7 enables efficient and secure use of data center resources to execute application code which potentially contains security vulnerabilities.

Alternatively or in addition to the other examples described herein, examples include any combination of the following:

Clause A. A computer system comprising:

at least two execution environments;

a separation mechanism which enforces separation between the at least two execution environments such that one execution environment is a gatekeeper which interposes on all communications of the other execution environment;

an attestation mechanism which enables the gatekeeper to attest to properties of the at least two execution environments;

a first one of the execution environments running application specific code which may contain security vulnerabilities;

the gatekeeper configured to enforce an input output policy on the first execution environment by interposing on all communication to and from the first execution environment by forwarding, modifying or dropping individual ones of the communications according to the policy;

such that outgoing communications from the first execution environment are sent out of the computer system according to the policy and incoming communications to the first execution environment are accepted according to the policy; and where the gatekeeper provides evidence of attestation both for the application specific code and the policy.

Clause B The computer system of clause A wherein the separation mechanism is implemented using hardware by deploying the gatekeeper on a processor and deploying the other execution environment on a separate processor and connecting the processors by an interrupt line.

Clause C The computer system of clause A or clause B wherein the other execution environment is deployed on a secure processor.

Clause D The computer system of any preceding clause wherein the processor deploying the gatekeeper has access to communications external of the computer system.

Clause E The computer system of any preceding clause wherein the separation mechanism is implemented using a plurality of privilege levels and where the gatekeeper is deployed in a highest one of the privilege levels.

Clause F The computer system of clause E comprising at least one communication channel between the privilege levels.

Clause G The computer system of clause E comprising a hypervisor and wherein the hypervisor cannot alter control or data flow in the privilege level holding the application specific code without going via the gatekeeper.

Clause H The computer system of clause E comprising a hypervisor and wherein the gatekeeper is configured to compute an attestation quote which guarantees that memory assigned by a lower privilege level is not accessible by the hypervisor and that neither the hypervisor nor the application specific code can modify the memory assigned by the lower privilege level.

Clause I The computer system of clause A wherein the separation mechanism is implemented using more than two privilege levels and where the gatekeeper is deployed in a highest one of the privilege levels and the application specific code is deployed at the other privilege levels.

Clause J The computer system of clause A wherein the separation mechanism is implemented using a software-enforced sandbox as the execution environment running the application specific code.

Clause K The computer system of clause A wherein the gatekeeper exposes at least one paravirtualized device that appears, from the point of view of the execution environment running the application specific code, as a storage device with built-in encryption support and a network interface with transport layer security offload.

Clause L The computer system of any preceding clause wherein the gatekeeper enforces both encryption and access-control using the policy.

Clause M The computer system of any preceding clause wherein the policy and/or the application specific code is replaceable by a new policy and/or application specific code.

Clause N A computer-implemented method performed by a gatekeeper which is part of a computer system, the method comprising:

enforcing an input output policy on a first execution environment by interposing on all communication to and from the first execution environment by forwarding, modifying or dropping individual ones of the communications according to a policy, wherein the enforcing is done using a separation mechanism of the computer system;

such that outgoing communications from the first execution environment are sent out of the computer system according to the policy and incoming communications to the first execution environment are accepted according to the policy; and computing evidence of attestation both for the application specific code and the policy using an attestation mechanism of the computer system.

Clause O The method of clause N comprising sending the evidence of attestation to an entity. In this way an entity such as party A or party B of FIG. 1 is able to know that the particular policy is being used and that the particular application specific code is being used.

Clause P The method of clause N or O comprising replacing the policy with a new policy and replacing the application specific code.

Clause Q The method of any of clauses N to P comprising exposing at least one paravirtualized device that appears, from the point of view of the execution environment running the application specific code, as a storage device with built-in encryption support and a network interface with transport layer security offload.

Clause R The method of any of clauses N to Q comprising deploying the gatekeeper on a processor and deploying the first execution environment on an isolated processor separate from the gatekeeper.

Clause S The method of clause R comprising connecting the gatekeeper to the secure processor.

Clause T One or more device-readable media with device-executable instructions that, when executed by a computer system, direct the computing system to perform for performing operations comprising:

enforcing an input output policy on a first execution environment by interposing on all communication to and from the first execution environment by forwarding, modifying or dropping individual ones of the communications according to a policy, wherein the enforcing is done using a separation mechanism of the computer system;

sending outgoing communications from the first execution environment out of the computer system according to the policy and accepting incoming communications to the first execution environment according to the policy; and computing evidence of attestation both for the application specific code and the policy using an attestation mechanism of the computer system.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer system comprising:
   at least two execution environments;
   a separation mechanism configured to:
      enforce separation between the at least two execution environments and
      based at least on the enforcing, causing one of the at least two execution environments to be a gatekeeper which interposes on all communications of other execution environment;
   an attestation mechanism which enables the gatekeeper to attest to properties of the at least two execution environments;
   a first one of the at least two execution environments running application specific code which may contain security vulnerabilities;
   the gatekeeper configured to enforce an input output policy on the first execution environment by interposing on all communication to and from the first one of the at least two execution environments by forwarding, modifying or dropping individual ones of the communications according to the policy causing outgoing communications from the first one of the at least two execution environment to be sent out of the computer system according to the policy and incoming communications to the first one of the at least two execution environment are accepted according to the policy; and
   where the gatekeeper provides evidence of attestation both for the application specific code and the policy, wherein the evidence produced by the attestation mechanism comprises one of a cryptographic signature or a certificate, thereby limiting which entities the application specific code is able to communicate with.

2. The computer system of claim 1 wherein the separation mechanism is implemented using hardware by deploying the gatekeeper on a processor and deploying the other execution environment on a separate processor and connecting the processors by an interrupt line.

3. The computer system of claim 1 wherein the other execution environment is deployed on a processor.

4. The computer system of claim 1 wherein the processor deploying the gatekeeper has access to communications external of the computer system.

5. The computer system of claim 1 wherein the separation mechanism is implemented using a plurality of privilege levels and where the gatekeeper is deployed in a highest one of the privilege levels.

6. The computer system of claim 5 comprising at least one communication channel between the privilege levels.

7. The computer system of claim 5 comprising a hypervisor and wherein the hypervisor cannot alter control or data flow in the privilege level holding the application specific code without going via the gatekeeper.

8. The computer system of claim 5 comprising a hypervisor and wherein the gatekeeper is configured to compute an attestation quote which guarantees that memory assigned by a lower privilege level is not accessible by the hypervisor and that neither the hypervisor nor the application specific code can modify the memory assigned by the lower privilege level.

9. The computer system of claim 1 wherein the separation mechanism is implemented using more than two privilege levels and where the gatekeeper is deployed in a highest one of the privilege levels and the application specific code is deployed at the other privilege levels.

10. The computer system of claim 1 wherein the separation mechanism is implemented using a software-enforced sandbox as the execution environment running the application specific code.

11. The computer system of claim 1 wherein the gatekeeper exposes at least one paravirtualized device that appears, from the point of view of the execution environment running the application specific code, as a storage device with built-in encryption support and a network interface with transport layer security offload.

12. The computer system of claim 1 wherein the gatekeeper enforces both encryption and access-control using the policy.

13. The computer system of claim 1 wherein the policy and/or the application specific code is replaceable by a new policy and/or application specific code.

14. A computer-implemented method performed by a gatekeeper which is part of a computer system, the method comprising:

enforcing an input output policy on a first execution environment by interposing on all communication to and from the first execution environment by forwarding, modifying or dropping individual ones of the communications according to a policy;

causing outgoing communications from the first execution environment are sent out of the computer system according to the policy and incoming communications to the first execution environment are accepted according to the policy; and computing evidence of attestation both for application specific code and the policy using an attestation mechanism of the computer system, wherein the evidence produced by the attestation mechanism comprises one of a cryptographic signature or a certificate, thereby limiting which entities the application specific code is able to communicate with.

15. The method of claim 14 comprising sending the evidence of attestation to an entity.

16. The method of claim 14 comprising replacing the policy with a new policy and replacing the application specific code.

17. The method of claim 14 comprising exposing at least one paravirtualized device that appears, from the point of view of the execution environment running the application specific code, as a storage device with built-in encryption support and a network interface with transport layer security offload.

18. The method of claim 14 comprising deploying the gatekeeper on a processor and deploying the first execution environment on an isolated processor separate from the gatekeeper.

19. The method of claim 18 comprising connecting the gatekeeper to the processor.

20. One or more computer-readable hardware devices comprising device-readable media with device-executable instructions that, when executed by a computer system, direct the computing system to perform for performing operations comprising:

enforcing an input output policy on a first execution environment by interposing on all communication to and from the first execution environment by forwarding, modifying or dropping individual ones of the communications according to a policy;

sending outgoing communications from the first execution environment out of the computer system according to the policy and accepting incoming communications to the first execution environment according to the policy; and computing evidence of attestation both for application specific code and the policy using an attestation mechanism of the computer system, wherein the evidence produced by the attestation mechanism comprises one of a cryptographic signature or a certificate, thereby limiting which entities the application specific code is able to communicate with.

\* \* \* \* \*